(12) United States Patent
Lee et al.

(10) Patent No.: US 10,904,517 B2
(45) Date of Patent: Jan. 26, 2021

(54) DISPLAY PANEL, HEAD MOUNTED DISPLAY DEVICE INCLUDING THE SAME, AND METHOD OF DISPLAYING IMAGE BY USING HEAD MOUNTED DISPLAY DEVICE

(71) Applicant: Samsung Display Co., Ltd., Yongin-si (KR)

(72) Inventors: Hyun Koo Lee, Yongin-si (KR); Soo Young Kim, Yongin-si (KR); Min Tak Lee, Yongin-si (KR); Kyu Seok Kim, Yongin-si (KR); Young Nam Yun, Yongin-si (KR); Si Beak Pyo, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 338 days.

(21) Appl. No.: 15/785,287

(22) Filed: Oct. 16, 2017

(65) Prior Publication Data
US 2018/0108328 A1 Apr. 19, 2018

(30) Foreign Application Priority Data
Oct. 18, 2016 (KR) .......................... 10-2016-0135009

(51) Int. Cl.
*H04N 13/344* (2018.01)
*G09G 3/00* (2006.01)
(Continued)

(52) U.S. Cl.
CPC ........... *H04N 13/344* (2018.05); *G09G 3/002* (2013.01); *G09G 5/10* (2013.01); *H04N 13/133* (2018.05);
(Continued)

(58) Field of Classification Search
CPC .. G09G 5/10; G09G 3/002; G09G 2320/0233; G09G 2360/16; G06F 3/1423;
(Continued)

(56) References Cited

U.S. PATENT DOCUMENTS

| 9,316,831 B2 | 4/2016 | Takahashi et al. |
| 2012/0154381 A1* | 6/2012 | Chen .................... H04N 13/341 345/419 |

(Continued)

FOREIGN PATENT DOCUMENTS

| KR | 10-2014-0089345 A | 7/2014 |
| KR | 10-2016-0044272 A | 4/2016 |

*Primary Examiner* — Jonathan A Boyd
(74) *Attorney, Agent, or Firm* — Lewis Roca Rothgerber Christie LLP (57) ABSTRACT

A display panel including: a display unit configured to provide a first image to one of a left eyeball and a right eyeball of a user and to provide a second image having the same tone as a tone of the first image to the other one of the left eyeball and the right eyeball of the user; a brightness correcting unit configured to generate second image data corresponding to the second image by using first image data corresponding to the first image; and a data driver configured to generate a first data signal based on the first image data, to generate a second data signal based on the second image data, and to provide the first and second data signals to the display unit, and the first image and the second image are displayed with different brightnesses during at least a part of an image display period.

15 Claims, 5 Drawing Sheets

(51) Int. Cl.
 *H04N 13/398* (2018.01)
 *H04N 13/133* (2018.01)
 *G09G 5/10* (2006.01)

(52) U.S. Cl.
 CPC ....... *H04N 13/398* (2018.05); *G09G 2360/16* (2013.01); *H04N 2213/002* (2013.01)

(58) Field of Classification Search
 CPC .. H04N 13/344; H04N 13/398; H04N 13/133; H04N 2213/002
 See application file for complete search history.

(56) References Cited

U.S. PATENT DOCUMENTS

| | | | |
|---|---|---|---|
| 2012/0194660 A1* | 8/2012 | Nakamura | H04N 13/341 348/56 |
| 2014/0085442 A1* | 3/2014 | Ono | G02B 27/26 348/58 |
| 2015/0371450 A1* | 12/2015 | Peterson | H04N 13/122 345/419 |
| 2016/0057410 A1* | 2/2016 | Huang | G02B 27/2264 348/53 |
| 2016/0109937 A1 | 4/2016 | Kim et al. | |
| 2016/0148414 A1* | 5/2016 | Itani | G06T 3/40 345/419 |

* cited by examiner

Avg.LU1 > Avg.LU2

DISPLAY PANEL, HEAD MOUNTED DISPLAY DEVICE INCLUDING THE SAME, AND METHOD OF DISPLAYING IMAGE BY USING HEAD MOUNTED DISPLAY DEVICE

CROSS-REFERENCE TO RELATED APPLICATION

This application claims priority to and the benefit of Korean Patent Application No. 10-2016-0135009, filed on Oct. 18, 2016 in the Korean Intellectual Property Office, the entire content of which is incorporated herein by reference.

BACKGROUND

1. Field

Aspects of embodiments of the present disclosure relate to a display panel, a head mounted display device including the same, and a method of displaying images by using the head mounted display device.

2. Description of the Related Art

Wearable electronic devices, which have a wearable form on a body, have been actively developed. Among wearable electronic devices, a Head Mounted Display (HMD) device refers to a display device that displays an image in front of the eyes of a user in a virtual reality or augmented reality system and has a form of glasses (e.g., safety glasses) or a helmet.

The HMD device may include a display unit mounted with a light display panel for displaying an image, a driver for controlling the display unit, and the like, and may include an optical system, such as a lens, which controls or focuses an image generated by the display unit to be recognized as a virtual image spaced from the user.

SUMMARY

Embodiments of the present disclosure provide a display panel that decreases fatigue of a user caused by usage of a head mounted display device, a head mounted display device including the same, and a method of displaying images by using the head mounted display device.

An exemplary embodiment of the present disclosure provides a display panel including: a display unit configured to provide a first image to one of a left eyeball and a right eyeball of a user and to provide a second image having the same tone as a tone of the first image to the other one of the left eyeball and the right eyeball of the user; a brightness correcting unit configured to generate second image data corresponding to the second image by using first image data corresponding to the first image; and a data driver configured to generate a first data signal based on the first image data, to generate a second data signal based on the second image data, and to provide the first and second data signals to the display unit, and the first image and the second image are displayed with different brightnesses during at least a part of an image display period.

The brightness correcting unit may generate the second image data so that a difference between a first average brightness value of the first image and a second average brightness value of the second image exists within a reference brightness difference range.

When a second average brightness value of the second image is increased or decreased during the image display period, a first average brightness value of the first image may be uniformly maintained.

A first average brightness value of the first image may be maintained to be greater than a second average brightness value of the second image during at least the part of the image display period.

The image display period may include a first image display period during which the first image is provided to the left eyeball of the user and the second image is provided to the right eyeball of the user, and a second image display period during which the first image is provided to the right eyeball of the user and the second image is provided to the left eyeball of the user.

The first image display period and the second image display period may be alternately repeated.

Each of the first image display period and the second image display period may include a maintenance period during which a difference between a first average brightness value of the first image and a second average brightness value of the second image is uniformly maintained, and a dimming period during which a difference between the first average brightness value and the second average brightness value is increased or decreased.

The maintenance period and the dimming period may be alternately repeated.

A difference between a first average brightness value and a second average brightness value may be sequentially increased or decreased during the dimming period.

The display unit may include a first panel and a second panel, the first panel may display the first image and the second panel may display the second image during the first image display period, and the first panel may display the second image and the second panel may display the first image during the second image display period.

Another exemplary embodiment of the present disclosure provides a head mounted display device including: a display panel configured to concurrently (e.g., simultaneously) display a first image and a second image having the same tone as a tone of the first image; a lens configured to collect the first image and the second image; and a frame configured to fix the display panel and the lens. The display panel includes: a display unit configured to provide the first image to one of a left eyeball and a right eyeball of a user and to provide the second image to the other one of the left eyeball and the right eyeball of the user; a brightness correcting unit configured to generate second image data corresponding to the second image by using first image data corresponding to the first image; and a data driver configured to generate a first data signal based on the first image data, to generate a second data signal based on the second image data, and to provide the first and second data signals to the display unit, and the first image and the second image are displayed with different brightnesses during at least a part of an image display period.

The brightness correcting unit may generate the second image data so that a difference between a first average brightness value of the first image and a second average brightness value of the second image exists within a reference brightness difference range.

When a second average brightness value of the second image is increased or decreased during the image display period, a first average brightness value of the first image may be uniformly maintained.

A first average brightness value of the first image may be maintained to be greater than a second average brightness value of the second image during at least the part of the image display period.

The image display period may include a first image display period during which the first image is provided to the left eyeball of the user and the second image is provided to the right eyeball of the user, and a second image display period during which the first image is provided to the right eyeball of the user and the second image is provided to the left eyeball of the user.

Yet another exemplary embodiment of the present disclosure provides a method of displaying an image by using a head mounted display device that is configured to provide a first image to one of a left eyeball and a right eyeball of a user and to provide a second image having the same tone as a tone of the first image to the other one of the left eyeball and the right eyeball of the user. The method includes: generating second image data by using first image data; generating a first data signal based on the first image data and generating a second data signal based on the second image data; and concurrently (e.g., simultaneously) displaying the first image and the second image with different brightnesses by using the first and second data signals.

The generating of the second image data may include generating the second image data so that a difference between a first average brightness value of the first image and a second average brightness value of the second image exists within a reference brightness difference range.

The concurrently (e.g., simultaneously) displaying the first image and the second image may include displaying the second image with a lower brightness than the brightness of the first image.

The concurrently displaying the first image and the second image may include uniformly maintaining the brightness of the first image and gradually decreasing or increasing the brightness of the second image during an image display period during which the first image and the second image are displayed.

According to exemplary embodiments of the present disclosure, the display panel, the head mounted display device including the same, and the method of displaying images by using the same may decrease the brightness of an image provided to the one of a user's eyeballs (e.g., decreases brightness of an image to an eyeball within a range) such that a user cannot recognize a change in the image brightness to prevent a user from feeling discomfort caused by the change in brightness and to decrease the quantity of light incident to the eyeballs of the user, thereby decreasing fatigue of the user.

BRIEF DESCRIPTION OF THE DRAWINGS

Example embodiments will now be described more fully hereinafter with reference to the accompanying drawings; however, the present disclosure may be embodied in different forms and should not be construed as limited to the exemplary embodiments set forth herein. Rather, these embodiments are provided so that this disclosure will be thorough and complete and will fully convey the scope of the present disclosure to those skilled in the art.

In the drawings, dimensions may be exaggerated for clarity of illustration, and like reference numerals refer to like elements throughout.

DETAILED DESCRIPTION

In the exemplary embodiments disclosed in the present specification, a specifically-described structure or function is illustrative for the purpose of explaining exemplary embodiments of the present disclosure. The present disclosure may be embodied in various forms, and the present disclosure is not limited to the exemplary embodiments described in the present specification.

Further, exemplary embodiments according to the present disclosure may be variously modified and have various forms. Thus, while specific exemplary embodiments will be illustrated in the drawings and described in detail in the present specification, this is not intended to limit the present disclosure to the specifically-disclosed forms, and the present disclosure includes all of the changes, the equivalent matters and forms, or the replacement matters and forms included in the spirit and the technical scope of the present disclosure.

The terms "first", "second", and the like may be used to describe various constituent elements, but the constituent elements should not be limited by these terms. These terms are for the purpose of discriminating one constituent element from another constituent element. For example, without departing from the scope of the present disclosure, a first constituent element may be named as a second constituent element, and similarly, a second constituent element may be named as a first constituent element.

Terms used in the present application are used only to describe specific exemplary embodiments and are not intended to limit the present disclosure. As used herein, the singular forms are intended to include the plural forms as well, unless the context clearly indicates otherwise. In this specification, it should be understood that terms, "comprise," "include," "have," and variations thereof indicate that a feature, a number, a step, an operation, a component, a part, or a combination thereof described in the specification is present but does not exclude a possibility of the presence or addition of one or more other features, numbers, steps, operations, components, parts, or combinations thereof. As used herein, the singular forms "a" and "an" are intended to include the plural forms as well, unless the context clearly indicates otherwise.

If they are not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but should not be interpreted in an ideally or excessively formal manner if it is not clearly defined in this specification.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Hereinafter, exemplary embodiments of the present disclosure will be described, in detail, with reference to the accompanying drawings.

Figure 1:
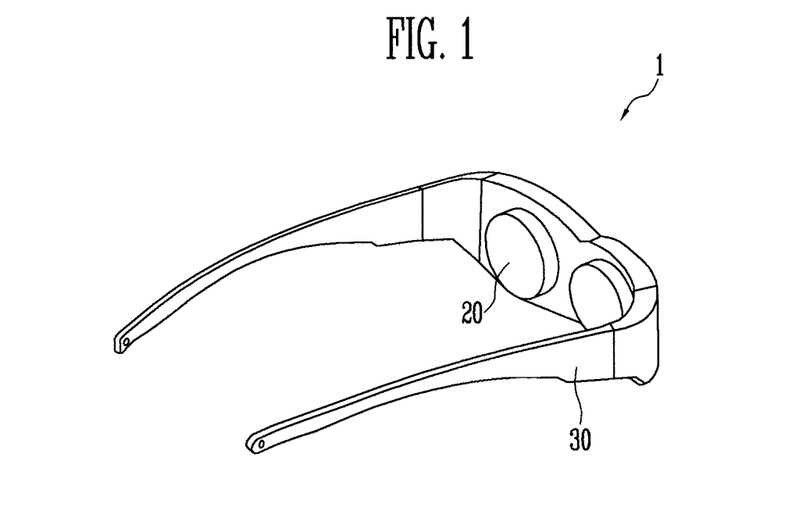
FIG. 1 is a diagram illustrating a head mounted display device according to an exemplary embodiment of the present disclosure.
Figure 2:
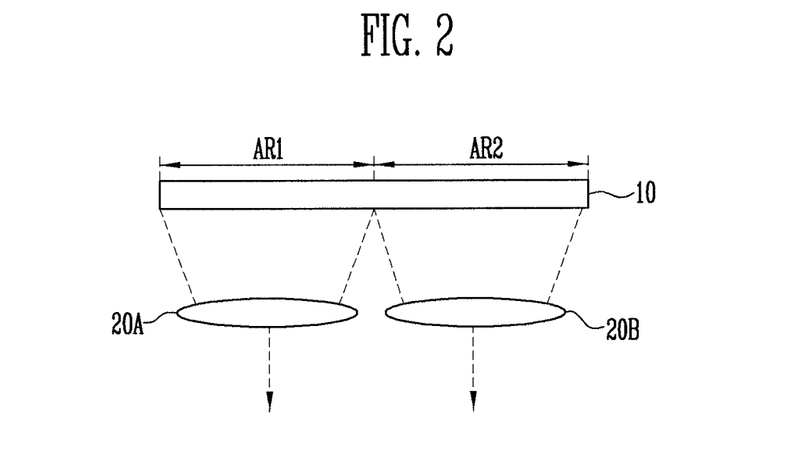
FIG. 2 is a diagram schematically illustrating a structure of the head mounted display device according to an exemplary embodiment of the present disclosure.

FIG. 1 is a diagram illustrating a head mounted display device according to an exemplary embodiment of the present disclosure, and FIG. 2 is a diagram schematically illustrating a structure of the head mounted display device illustrated in FIG. 1.

Referring to FIGS. 1 and 2, a Head Mounted Display (HMD) device 1 uses a stereoscopic vision method, which provides two different images to a user's eyeballs to enable the user to combine (subconsciously combine) the two images into one image and recognize the combined image.

The HMD device 1 includes a display unit 10 for displaying an image (e.g., for display the images), a lens 20 to collect (e.g., to adjust or focus) the image (e.g., the images), and a frame 30 fixing the display unit 10 and the lens 20.

The display unit 10 may display an image according to input image data and may have a first area AR1 and a second area AR2 which are capable of individually providing an image to a left eyeball and to a right eyeball of a user. The first area AR1 and the second area AR2 of the display unit 10 may display images having the same tone but different brightness.

For example, the display unit 10 may display a first image in the first area AR1 and may display a second image having the same tone as that of the first image but a different brightness from that of the first image in the second area AR2. In some embodiments, a difference between a first average brightness value of the first image and a second average brightness value of the second image is within a reference brightness range, in which the user cannot sense a brightness difference.

The lens 20 refracts the images output from the display unit 10 in the directions of the left and right eyeballs of the user. The lens 20 may include a first lens 20A for collecting the image displayed in the first area AR1 and a second lens 20B for collecting the image displayed in the second area AR2. The first lens 20A may provide the image collected from the first area AR1 to the left or right eyeball of the user, and the second lens 20B may provide the image collected from the second image AR2 to the other of the left or right eyeball of the user.

The user views the display unit 10 through the lens 20, thereby enjoying an effect (e.g., a simulated effect) of viewing an image on a large screen at a distance from the user.

The frame 30 may fix the display unit 10 and the lens 20 and may be formed in a wearable shape which the user may wear. In FIG. 1, the frame 30 is illustrated in the shape of eyeglasses, but the present disclosure is not limited thereto. For example, the frame may be formed in various shapes, such as a helmet, which the user may wear.

An HMD device in the related art provides the same brightness (e.g., images having the same brightness) to left and right eyeballs of a user, but the HMD device 1 according to an exemplary embodiment of the present disclosure provides images having different brightness to the left and right eyeballs of the user in order to decrease fatigue of the user.

For example, the HMD device 1 according to an exemplary embodiment of the present disclosure maintains the brightness of the image provided to the left or right eyeball of the user and decreases the brightness of the image provided to the other eyeball of the user, thereby decreasing fatigue of the user.

In some embodiments, the HMD device 1 decreases the brightness of the image provided to the other eyeball within a range that the user cannot recognize so that the user does not sense the change in brightness. Further, the HMD device 1 according to an exemplary embodiment of the present disclosure decreases the quantity of light incident to the eyeballs of the user compared to the HMD device in the related art so that it is possible to decrease fatigue of the user.

Figure 3:
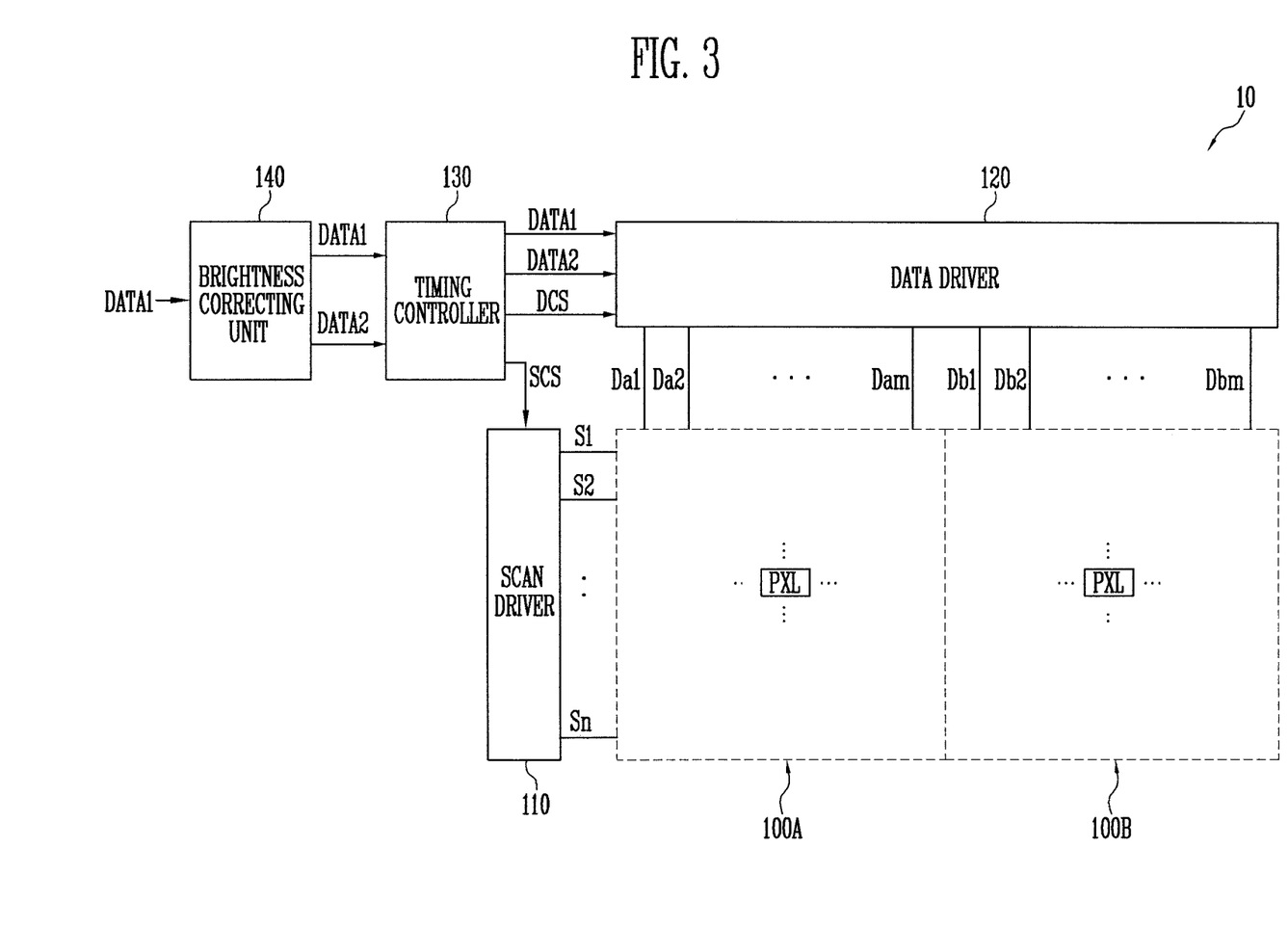
FIG. 3 is a diagram illustrating a display unit illustrated in FIG. 2 according to an exemplary embodiment of the present disclosure.

FIG. 3 is a diagram illustrating the display unit illustrated in FIG. 2 according to an exemplary embodiment of the present disclosure.

Referring to FIG. 3, the display unit 10 according to an exemplary embodiment of the present disclosure includes a first panel 100A, a second panel 100B, a brightness correcting unit 140, a timing controller 130, a data driver 120, and a scan driver 110.

The first panel 100A may display an image to the left eyeball of the user. The first panel 100A may include a plurality of pixels PXL located so as to be connected to scan lines S1 to Sn and data lines Da1 to Dam. The pixels PXL may be selected by scan signals supplied to the scan lines S1 to Sn and may receive data signals from the data lines Da1 to Dam. The pixels PXL receiving the data signals may supply light having a certain brightness to the first lens 20A in response to the data signals.

The second panel 100B may display an image to the right eyeball of the user. The second panel 100B may include a plurality of pixels PXL located so as to be connected to the scan lines S1 to Sn and data lines Db1 to Dbm. The pixels PXL may be selected by the scan signals supplied to the scan lines S1 to Sn and may receive data signals from the data lines Db1 to Dbm. The pixels PXL receiving the data signals may supply light having a certain brightness to the second lens 20B in response to the data signals.

For convenience of description, it is described that the image displayed by the first panel 100A is provided to the left eyeball through the first lens 20A and the image displayed by the second panel 100B is provided to the right eyeball through the second lens 20B. However, the present disclosure is not limited thereto, and the image displayed by the first panel 100A may be provided to the right eyeball through the first lens 20A and the image displayed by the second panel 100B is provided to the left eyeball through the second lens 20B.

The first panel 100A and the second panel 100B may be physically implemented in one panel but the present disclosure is not limited thereto. In some embodiments, the first panel 100A and the second panel 100B may be implemented in two physically divided panels.

The brightness correcting unit 140 may generate second image data DATA2 corresponding to a second image by using first image data DATA1 corresponding to a first image provided from a processor, for example, an application processor AP. Here, the second image means an image that has the same tone as that of the first image but has a lower average brightness value than that of the first image.

When the data signal generated based on the first image data DATA1 is displayed in each of the first panel 100A and the second panel 100B, the first panel 100A and the second panel 200B displays images having the same brightness. However, the brightness correcting unit 140 according to an exemplary embodiment of the present disclosure may generate the second image data DATA1 based on the first image data DATA1 such that the first panel 100A and the second panel 100B may display images having different brightnesses.

For example, the brightness correcting unit may generate the second image data DATA2 by using the first image data DATA1 so that a difference in the average brightness between the first image and the second image exists within the range that is not noticeable to the user.

According to an exemplary embodiment, the brightness correcting unit 140 may generate the second image data DATA2 based on the first image data DATA1 so that the difference in the average brightness between the first image and the second image is changed or varied during an image display period during which the images are displayed. In this case, even though the difference in the average brightness between the first image and the second image is increased or decreased during the image display period, the first average brightness value of the first image may be uniformly maintained. Here, the first average brightness value may mean an average value of the brightness of the first image displayed for one frame period, and a second average brightness value may mean an average value of the brightness of the second image displayed for one frame period.

The timing controller 130 may receive the first image data DATA1 and the second image data DATA2 from the brightness correcting unit 140 and may generate a data control signal DCS and a scan control signal SCS based on timing signals supplied from the outside.

The timing controller 130 may supply the first and second image data DATA1 and DATA2 and the data control signal DCS to the data driver 120 and may supply the scan control signal SCS to the scan driver 110.

The data control signal DCS may include a source start pulse and clock signals. The source start pulse may control a sampling start time of data, and the clock signals may be used for controlling a sampling operation.

The scan control signal SCS may include a start pulse and clock signals. A start pulse may control timing of the first scan signal or the first emission control signal, and the clock signals may be used for shifting the start pulse.

The data driver 120 may generate a first data signal by using the first image data DATA1 supplied from the timing controller 130 and may generate a second data signal by using the second image data DATA2 supplied from the timing controller 130. The data driver 120 may supply the first image data DATA1 and the second image data DATA2 to the different panels 100A and 100B.

For example, when the first panel 100A is to display the first image and the second panel 100B is to display the second image during a first image display period, the data driver 120 may provide the first data signal to the first panel 100A through the data lines Da1 to Dam and may provide the second data signal to the second panel 100B through the data lines Db1 to Dbm.

Further, when the first panel 100A is to display the second image and the second panel 100B is to display the first image during a second image display period, the data driver 120 may provide the second data signal to the first panel 100A through the data lines Da1 to Dam and may provide the first data signal to the second panel 100B through the data lines Db1 to Dbm.

As described above, the first image display period and the second image display period may be alternately repeated during the image display period.

The scan driver 110 sequentially supplies the scan signals to the scan lines S1 to Sn. For example, the scan driver 110 may sequentially supply the scan signals to the scan lines S1 to Sn. When the scan signals are sequentially supplied to the scan lines S1 to Sn, the pixels PXL may be selected by horizontal line, and the pixels PXL selected by the scan signals may receive the data signals.

According to an exemplary embodiment, the scan driver 110, the data driver 120, the timing controller 130, and the brightness correcting unit 140 may be formed in the display panel including the first panel 100A and the second panel 100B. For example, the scan driver 100, the data driver 120, the timing controller 130, and the brightness correcting unit 140 may be formed inside the display panel to be attached to the first panel 100A and the second panel 100B or may be integrally formed with the first panel 100A and the second panel 100B.

Further, FIG. 3 illustrates that the brightness correcting unit 140 is separately implemented from the timing controller 130, but according to other embodiments, the brightness correcting unit 140 may be implemented inside the timing controller 130.

Figure 4:
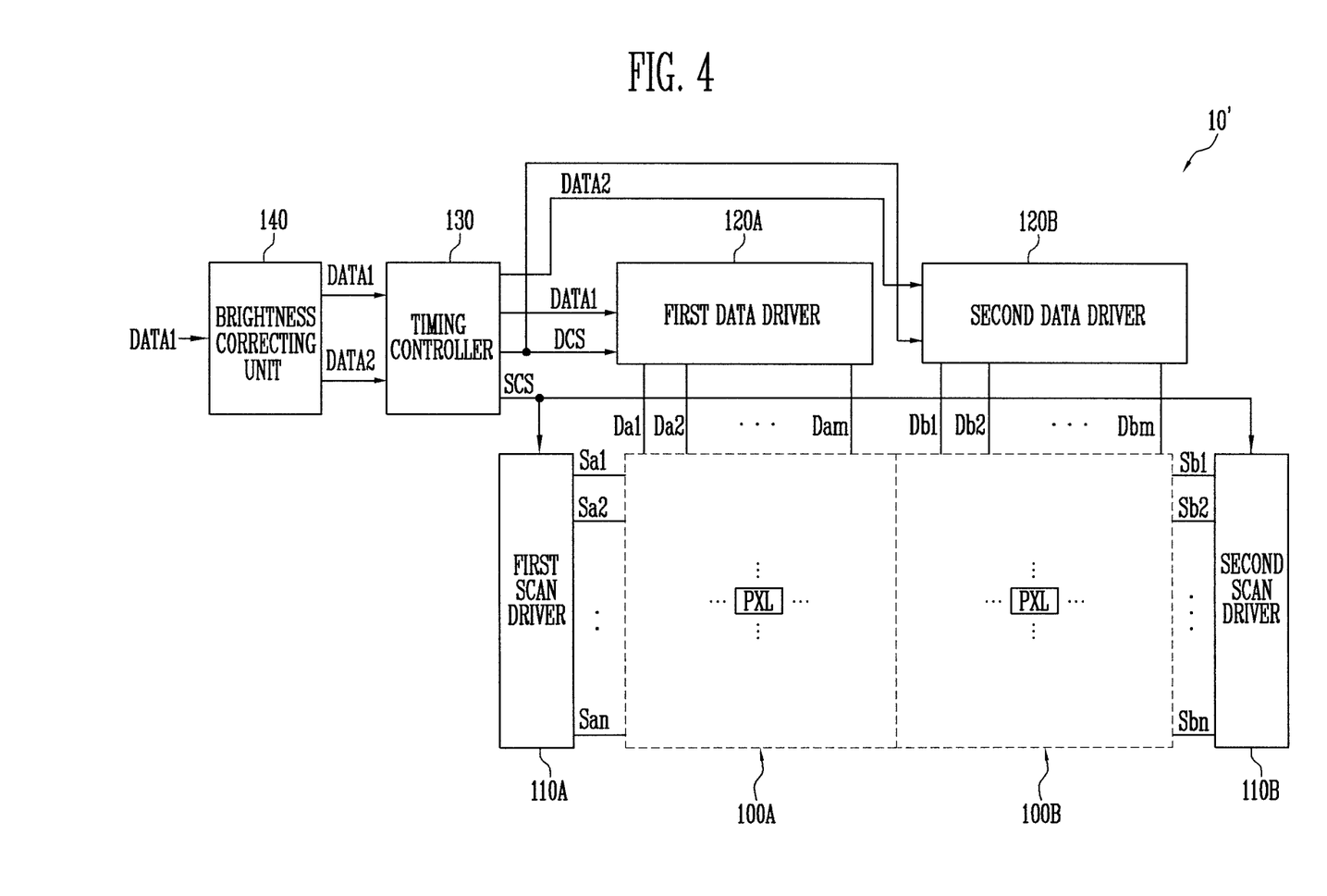
FIG. 4 is a diagram illustrating a display unit illustrated in FIG. 2 according to another exemplary embodiment of the present disclosure.

FIG. 4 is a diagram illustrating the display unit illustrated in FIG. 2 according to another exemplary embodiment of the present disclosure.

In order to avoid repeated descriptions, features of a display unit 10' illustrated in FIG. 4 that are different from those of the display unit 10 according to the exemplary embodiment illustrated in FIG. 3 will be primarily described. Other aspects and features of the display unit 10' that are not specially described with reference to FIG. 4 may be interpreted to be the same or substantially the same as those of the display unit 10 according to the aforementioned exemplary embodiment illustrated in FIG. 3. Further, the same reference numerals refer to the same elements, and similar reference numerals refer to the similar elements.

The display unit 10' according to another exemplary embodiment of the present disclosure includes a first panel 100A, a second panel 100B, a brightness correcting unit 140, a timing controller 130, first and second data drivers 120A and 120B, and first and second scan drivers 110A and 110B.

The timing controller 130 may supply first image data DATA1 and a data control signal DCS to the first data driver 120A and may supply second image data DATA2 and the data control signal DCS to the second data driver 120B.

The first data driver 120A may generate a first data signal by using the first image data DATA1 and may supply the first data signal to pixels PXL of the first panel 100A through data lines Da1 to Dam. Further, the second data driver 120B may generate a second data signal by using the second image data DATA2 and may supply the second data signal to the pixels PXL of the second panel 100B through data lines Db1 to Dbm.

The first scan driver 110A may supply scan signals to first scan lines Sa1 to San, and the pixels PXL of the first panel 100A receiving the scan signals may be selected by horizontal line and receive the first data signal. Further, the second scan driver 110B may supply scan signals to second scan lines Sb1 to Sbn, and the pixels PXL of the second panel 100B receiving the scan signals may be selected by horizontal line and receive the second data signal.

As described above, the display unit 10' according to another exemplary embodiment of the present disclosure may include a plurality of data drivers and a plurality of scan drivers for displaying a first image and a second image.

For convenience of describing embodiments of the present disclosure, in the display unit 10' illustrated in FIG. 4 the first panel 100A is set to display the first image based on the first data signal and the second panel 100B is set to display the second image based on the second data signal. However, the present disclosure is not limited thereto, and the first panel 100A may display the second image based on the second data signal and the second panel 100B may display the first image based on the first data signal.

Figure 5:
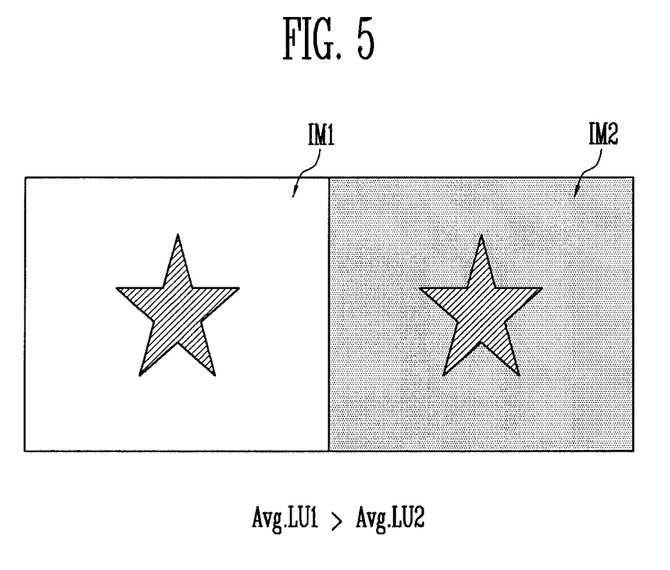
FIG. 5 is a diagram schematically illustrating a first image and a second image according to an exemplary embodiment of the present disclosure.

FIG. 5 is a diagram schematically illustrating a first image and a second image according to an exemplary embodiment of the present disclosure.

Referring to FIG. 5, a first image IM1 displayed by the first panel 100A and a second image IM2 displayed by the second panel 100B are illustrated.

The first image IM1 and the second image IM2 have the same tone, but the second image IM2 is displayed with lower brightness than that of the first image IM1. For example, a first average brightness value Avg.LU1 of the first image IM1 is greater than a second average brightness value Avg.LU2 of the second image IM2.

In some embodiments, a difference between the first average brightness value Avg.LU1 of the first image IM1 and the second average brightness value Avg.LU2 of the second image IM2 is within a reference brightness difference range such that a user cannot sense the brightness difference.

Because the user primarily views a center region of each image rather than outer regions thereof, the HMD device according to the exemplary embodiment of the present disclosure may display the first image IM1 and the second image IM2 so that a brightness difference between a center region of the first image IM1 and a center region of the second image IM2 exists within the reference brightness difference range such that the user cannot to recognize the brightness difference.

Figure 6:
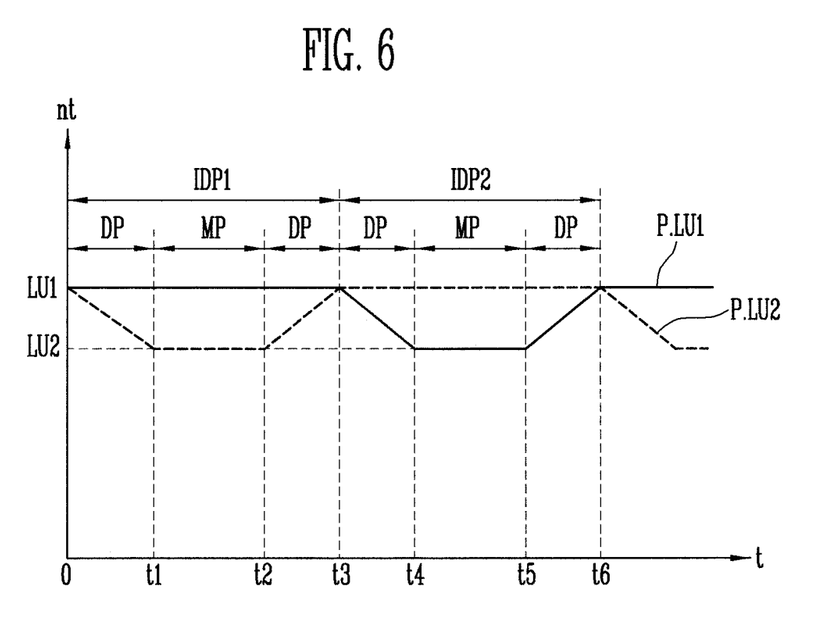
FIG. 6 is a graph representing average brightness values of images displayed by a first panel and a second panel according to an exemplary embodiment of the present disclosure.

FIG. 6 is a graph representing average brightness values of images displayed by the first panel and the second panel according to an exemplary embodiment of the present disclosure.

Referring to FIG. 6, a first graph P.LU1 representing an average brightness value of an image displayed by the first panel 100A and a second graph P.LU2 representing an average brightness value of an image displayed by the second panel 100B are illustrated.

Hereinafter, an image display method in which the HMD device 1 displays a first image IM1 through the first panel 100A and a second image IM2 through the second panel 100B during a first image display period IDP1 and displays the second image IM2 through the first panel 100A and the first image IM1 through the second panel 100B during a second image display period IDP2 will be described.

A first average brightness value Avg.LU1 of the first image IM1 during at least a part of the periods including the first image display period IDP1 and the second image display period IDP2 is maintained to be greater than a second average brightness value Avg.LU2 of the second image IM2. Further, the first image display period IDP1 and the second image display period IDP2 may be alternately repeated during the image display period.

Each of the first image display period IDP1 and the second image display period IDP2 includes a maintenance period MP and a dimming period DP.

Herein, the maintenance period MP means a period during which a difference between the first average brightness value Avg.LU1 of the first image IM1 and the second average brightness value Avg.LU2 of the second image IM2 is uniformly maintained, and the dimming period DP means a period during which a difference between the first average brightness value Avg.LU1 of the first image IM1 and the second average brightness value Avg.LU2 of the second image IM2 is increased or decreased.

The maintenance period MP and the dimming period DP may be alternately repeated during each of the first image display period IDP1 and the second image display period IDP2.

The first average brightness value Avg.LU1 of the first image IM1 displayed in the first panel 100A may be maintained with a first brightness value LU1 during the first image display period IDP1, but the second average brightness value Avg.LU2 of the second image IM2 displayed in the second panel 100B may be changed or maintained between the first brightness value LU1 and a second brightness value LU2 during the first image display period IDP1.

For example, during the dimming period DP (from a $0^{th}$ time 0 to a first time t1), the second average brightness value Avg.LU2 of the second image IM2 displayed by the second panel 100B may be gradually decreased from the first brightness value LU1 to the second brightness value LU2. During the maintenance period MP (from the first time t1 to a second time t2), the second average brightness value Avg.LU2 of the second image IM2 displayed by the second panel 100B may be maintained at the second brightness value LU2. During the dimming period DP (from the second time t2 to a third time t3 (e.g., a second dimming period DP)), the second average brightness value Avg.LU2 of the second image IM2 displayed by the second panel 100B may be gradually increased from the second brightness value LU2 to the first brightness value LU1.

During the second image display period IDP2, when the second image IM2 is displayed by the first panel 100A, the second average brightness value Avg.LU2 of the second image IM2 may be changed or maintained by the aforementioned method.

As described above, the HMD device 1 according to an exemplary embodiment of the present disclosure may gradually increase or decrease the second average brightness value Avg.LU2 of the second image IM2 such that a user does not to recognize a change in the brightness of the second image IM2. Further, the HMD device 1 according to an exemplary embodiment of the present disclosure may alternately adjust the brightness of the image displayed in the second panel 100B so that it is possible to prevent an image having relatively high brightness from being displayed in only one panel to prevent the one panel from being degraded.

Figure 7:
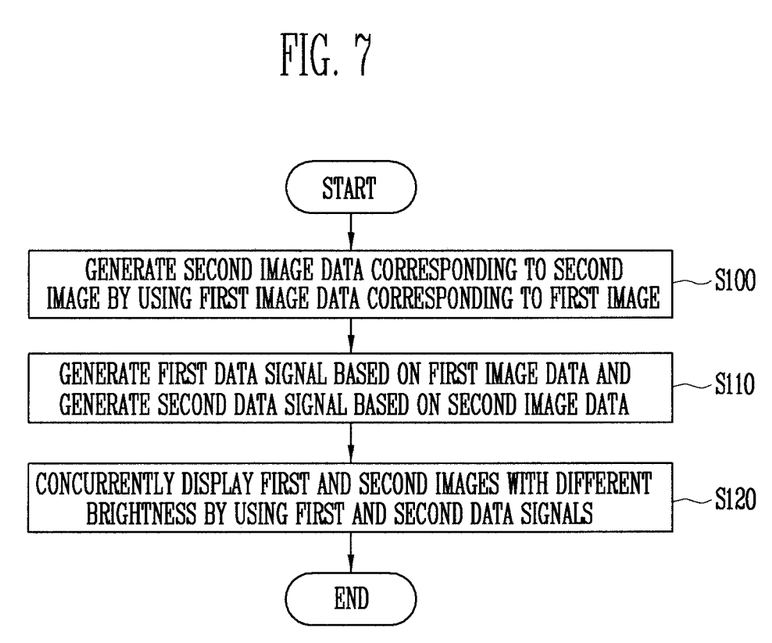
FIG. 7 is a flowchart for describing a method of displaying an image by using a head mounted display device according to an exemplary embodiment of the present disclosure.

FIG. 7 is a flowchart for describing a method of displaying an image by using the head mounted display device according to an exemplary embodiment of the present disclosure.

Referring to FIG. 7, the HMD device 1 according to an exemplary embodiment of the present disclosure may generate second image data DATA2 corresponding to a second image IM2 by using first image data DATA1 corresponding to a first image IM1 (S100).

The HMD device 1 according to an exemplary embodiment of the present disclosure may generate a first data signal based on the first image data DATA1 and may generate a second data signal based on the second image data DATA2 (S110).

The HMD device 1 according to an exemplary embodiment of the present disclosure may concurrently (e.g., simultaneously) display the first and second images IM1 and IM2 with different brightnesses in the first panel 100A and the second panel 100B, respectively, by using the first and second data signals (S120).

The present disclosure has been described with reference to exemplary embodiments illustrated in the drawings, but the described exemplary embodiments are only illustrative. It would be appreciated by those skilled in the art that various modifications and equivalent exemplary embodiments may be made within the spirit and scope of the present disclosure. Accordingly, the scope of the present disclosure is defined by the spirit of the appended claims and their equivalents.

What is claimed is:

1. A display panel comprising:
a display unit configured to provide a first image to one of a left eyeball and a right eyeball of a user and to provide a second image having the same tone as a tone of the first image to the other one of the left eyeball and the right eyeball of the user;
a brightness correcting unit configured to generate second image data corresponding to the second image by using first image data corresponding to the first image; and
a data driver configured to generate a first data signal based on the first image data, to generate a second data signal based on the second image data, and to provide the first and second data signals to the display unit,
wherein the first image and the second image are concurrently displayed with different brightnesses during at least a part of an image display period,
wherein the image display period comprises:
a first image display period during which the first image is provided to the left eyeball of the user and the second image is provided to the right eyeball of the user; and
a second image display period during which the first image is provided to the right eyeball of the user and the second image is provided to the left eyeball of the user, and
wherein each of the first image display period and the second image display period comprises:
a maintenance period during which a difference between a first average brightness value of the first image and a second average brightness value of the second image is uniformly maintained; and
a dimming period during which a difference between the first average brightness value and the second average brightness value is increased or decreased.

2. The display panel of claim 1, wherein the brightness correcting unit is configured to generate the second image data so that a difference between a first average brightness value of the first image and a second average brightness value of the second image exists within a reference brightness difference range.

3. The display panel of claim 1, wherein, when a second average brightness value of the second image is increased or decreased during the image display period, a first average brightness value of the first image is uniformly maintained.

4. The display panel of claim 1, wherein a first average brightness value of the first image is maintained to be greater than a second average brightness value of the second image during at least the part of the image display period.

5. The display panel of claim 1, wherein the first image display period and the second image display period are alternately repeated.

6. The display panel of claim 1, wherein the maintenance period and the dimming period are alternately repeated.

7. The display panel of claim 1, wherein a difference between a first average brightness value and a second average brightness value is sequentially increased or decreased during the dimming period.

8. The display panel of claim 1, wherein the display unit comprises a first panel and a second panel,
wherein the first panel displays the first image and the second panel displays the second image during the first image display period, and
wherein the first panel displays the second image and the second panel displays the first image during the second image display period.

9. A head mounted display device comprising:
a display panel configured to concurrently display a first image and a second image having the same tone as a tone of the first image;
a lens configured to collect the first image and the second image; and
a frame configured to fix the display panel and the lens,
wherein the display panel comprises:
a display unit configured to provide the first image to one of a left eyeball and a right eyeball of a user and to provide the second image to the other one of the left eyeball and the right eyeball of the user;
a brightness correcting unit configured to generate second image data corresponding to the second image by using first image data corresponding to the first image; and
a data driver configured to generate a first data signal based on the first image data, to generate a second data signal based on the second image data, and to provide the first and second data signals to the display unit, and wherein the first image and the second image are displayed with different brightnesses during at least a part of an image display period, wherein, when a second average brightness value of the second image is increased or decreased during the image display period, a first average brightness value of the first image is uniformly maintained.

10. The head mounted display device of claim 9, wherein the brightness correcting unit is configured to generate the second image data so that a difference between a first average brightness value of the first image and a second average brightness value of the second image is within a reference brightness difference range.

11. The head mounted display device of claim 9, wherein a first average brightness value of the first image is maintained to be greater than a second average brightness value of the second image during at least the part of the image display period.

12. The head mounted display device of claim 9, wherein the image display period comprises:

a first image display period during which the first image is provided to the left eyeball of the user and the second image is provided to the right eyeball of the user; and a second image display period during which the first image is provided to the right eyeball of the user and the second image is provided to the left eyeball of the user.

13. A method of displaying an image by using a head mounted display device, the head mounted display device being configured to provide a first image to one of a left eyeball and a right eyeball of a user and to provide a second image having the same tone as a tone of the first image to the other one of the left eyeball and the right eyeball of the user, the method comprising:

generating second image data by using first image data;

generating a first data signal based on the first image data and generating a second data signal based on the second image data; and concurrently displaying the first image and the second image with different brightnesses according to the first and second data signals, wherein the concurrently displaying the first image and the second image comprises uniformly maintaining the brightness of the first image and gradually decreasing or increasing the brightness of the second image during an image display period during which the first image and the second image are displayed.

14. The method of claim 13, wherein the generating of the second image data comprises generating the second image data so that a difference between a first average brightness value of the first image and a second average brightness value of the second image exists within a reference brightness difference range.

15. The method of claim 13, wherein the concurrently displaying the first image and the second image comprises displaying the second image with a lower brightness than the brightness of the first image.

\* \* \* \* \*